(12) United States Patent
Kawatake

(10) Patent No.: US 8,037,601 B2
(45) Date of Patent: Oct. 18, 2011

(54) MANUFACTURING METHOD FOR ROCKER ARM

(75) Inventor: Yoshio Kawatake, Osaka (JP)

(73) Assignees: Nakanishi Metal Works Co., Ltd., Osaka-Shi (JP); Otics Corporation, Nishio-Shi (JP)

( * ) Notice: Subject to any disclaimer, the term of this patent is extended or adjusted under 35 U.S.C. 154(b) by 821 days.

(21) Appl. No.: 11/990,784

(22) PCT Filed: Aug. 1, 2006

(86) PCT No.: PCT/JP2006/315204
§ 371 (c)(1),
(2), (4) Date: Feb. 21, 2008

(87) PCT Pub. No.: WO2007/023646
PCT Pub. Date: Mar. 1, 2007

(65) Prior Publication Data
US 2009/0229124 A1 Sep. 17, 2009

(30) Foreign Application Priority Data
Aug. 22, 2005 (JP) ................................ 2005-239808

(51) Int. Cl.
*B21K 1/20* (2006.01)

(52) U.S. Cl. .......... 29/888.2; 29/253; 29/275; 29/283.5

(58) Field of Classification Search ....... 29/888–888.41, 29/253, 275, 283.5
See application file for complete search history.

(56) References Cited

U.S. PATENT DOCUMENTS

| | | | | |
|---|---|---|---|---|
| 6,615,635 | B2 * | 9/2003 | Ammon | 72/379.2 |
| 6,889,643 | B2 * | 5/2005 | Motohashi | 123/90.39 |
| 7,062,852 | B2 * | 6/2006 | Shimizuya | 29/888.2 |
| 7,631,425 | B2 * | 12/2009 | Kamiji et al. | 29/888.2 |
| 7,788,805 | B2 * | 9/2010 | Kamiji | 29/888.2 |
| 2004/0000278 | A1 * | 1/2004 | Motohashi | 123/90.39 |
| 2004/0261739 | A1 * | 12/2004 | Shimizuya | 123/90.44 |

FOREIGN PATENT DOCUMENTS

| | | |
|---|---|---|
| JP | 2001-55913 | 2/2001 |
| JP | 2001-129633 | 5/2001 |
| JP | 2001-198641 | 7/2001 |
| WO | WO 2005/021183 A1 | 3/2005 |

\* cited by examiner

*Primary Examiner* — Derris H Banks
*Assistant Examiner* — Kaying Kue
(74) *Attorney, Agent, or Firm* — Kratz, Quintos & Hanson, LLP

(57) ABSTRACT

The present invention provides a rocker arm manufacturing method capable of stably forming valve stem guide walls. In the method according to the present invention, an intermediate product 13 having both side walls 20 extended in a predetermined direction and arranged in parallel with each other and a one end side connection wall 30 connecting lower ends of both the side walls 20 at a longitudinal one end of the product is obtained. Next, a first pressing punch 70 is pressed against the outer surface portions of both the side walls 20 from the outside thereof to cause downward plastic flows of regions of the outer surface portions of both the side walls positioned below the cutout portions 31 to thereby form raising walls 32 in a downwardly protruded manner at both sides of the one end side connection wall 30. Thereafter, valve stem guide walls 35 are formed by pressing second pressing punches 80 against both the raising walls 32 of the one end side connection wall 30.

16 Claims, 4 Drawing Sheets

(a)

(b)

(c)

MANUFACTURING METHOD FOR ROCKER ARM

TECHNICAL FIELD

The present invention relates to a method for manufacturing a rocker arm for opening and closing a valve in a valve gear for use in, e.g., vehicle internal combustion engines.

BACKGROUND TECHNIQUE

A valve gear for use in vehicle internal combustion engines is provided with a rocker arm for converting a rotary motion of a cam which rotates in conjunction with a crankshaft into a reciprocating motion of a valve stem for a valve, such as, e.g., an intake valve or an exhaust valve. This rocker arm is configured to swing about the pivot axis as a fulcrum located at a longitudinal end portion thereof in accordance with the rotary motion of a cam to cause up-and-down motions of a valve stem by pressing down the swinging end portion of the rocker arm to thereby open and close the valve.

A rocker arm is provided with a valve stem contacting end portion of a U-shape in cross-section at a longitudinal one end thereof so that a valve stem is brought into contact with the bottom wall (connection wall) of the valve stem contacting end portion. Furthermore, at both sides of the lower surface of the connection wall of the valve stem contacting end portion, a pair of valve stem guide walls extending in the longitudinal direction of the rocker arm are provided. It is configured such that a valve stem is disposed between these guide walls to prevent the horizontal displacements of the rocker arm with respect to the valve stem.

This kind of rocker arm is complicated in configuration and required to have high rigidity. Therefore, conventionally, such rocker arm is generally manufactured by forging or precision casting (lost-wax process).

In recent years, however, in accordance with the increased rotating speed and increased output of an internal combustion engine, it has been required to attain a lighter rocker arm to reduce the inertia weight. Thus, a number of techniques for manufacturing a rocker arm by press working have been proposed.

In manufacturing a rocker arm by press working, as a processing method of a valve stem contacting end portion, for example, a processing method as disclosed by the following Patent Document 1 is well known. In this method, a valve stem contacting end portion formed into a U-shape in cross-section by pressing working is subjected to pressure forming to increase the thickness of the lower both sides of the bottom wall of the valve stem contacting end portion to obtain the increased thickness portions, and then the increased thickness portions are subjected to pressure forming to form protruded portions as valve stem guide walls.
Patent Document 1: Japanese Unexamined Laid-open Patent Publication No. 2001-198641 (see claims and FIGS. 4 to 12)

DISCLOSURE OF THE INVENTION

Problems to be Solved by the Invention

In the conventional rocker arm manufacturing method disclosed in the aforementioned Patent Document 1, pressure forming is executed to cause the plastic flow (material flow) of the constituent metallic material for the purpose of, e.g., increasing the thickness of the valve stem contacting end portion or forming the increased thickness portions.

In such a plastic flow processing, however, it is difficult to accurately control the flow direction or flow amount of the material, and therefore there are problems that valve stem guide walls cannot be formed stably.

The present invention was made to solve the problems of the aforementioned conventional technique and aims to provide a rocker arm manufacturing method capable of forming a valve stem guide wall stably.

Means to Solve the Problems

In order to attain the aforementioned objects, the present invention has the following features.

[1] A method for manufacturing a rocker arm, the method comprising:
a step of obtaining an intermediate product having both side walls extended in a predetermined direction and arranged in parallel with each other and a one end side connection wall connecting lower ends of both the side walls at a longitudinal one end side of the intermediate product;
a cutout forming step of forming cutout portions extended in a longitudinal direction of the intermediate product on outer surface portions of both the side walls by pressing cutout forming punches against both side walls located at one end side of the intermediate product from the outside thereof;
a first pressing step of forming raising walls in a downwardly protruded manner at both sides of the one end side connection wall by pressing a first pressing punch against the outer surface portions of both the side walls from the outside thereof to cause downward plastic flows of regions of the outer surface portions of both the side walls positioned below the cutout portions; and
a second pressing step of forming valve stem guide walls by pressing second pressing punches against both the raising walls of the one end side connection wall.

[2] The method of manufacturing a rocker arm as recited in the aforementioned Item 1, wherein the cutout forming-punch is formed to have a pressing surface constituted by a downwardly inclined plane in which the pressing surface retreats with respect to a pressing direction toward a lower side thereof.

[3] The method of manufacturing a rocker arm as recited in the aforementioned Item 1 or 2, wherein the first pressing punch is formed to have a pressing surface perpendicular to a vertical plane.

[4] The method of manufacturing a rocker arm as recited in any one of the aforementioned Items 1 to 3, wherein the second pressing punch is formed to have a pressing surface formed by an upwardly inclined plane in which the pressing surface advances with respect to a pressing direction toward a lower side thereof.

[5] The method of manufacturing a rocker arm as recited in any one of the aforementioned Items 1 to 4, wherein end portions of the cutout portions are not extended to longitudinal end portions of both side walls, whereby no cutout portion is formed at the longitudinal end portions of both side walls.

Effects of the Invention

According to the rocker arm manufacturing method of the invention [1], in forming the guide walls at the one end side connection wall, after forming the cutout portions on the outer surface portions of both side walls, the regions positioned below the cutout portions are pressed downward with pressing punches to cause downward plastic flows to thereby form the guide walls. This enables to prevent the problem that the pressed outer surface portions of both side walls are plastically fluidized upward, causing an accurate downward flow. Thus, the movement of the material can be accurately controlled to thereby stably form desired valve stem guide walls.

Furthermore, the outer surface portions of both side walls are pressed to cause gradual plastic flows by a total of two pressing steps, or the first and second pressing steps. Therefore, as compared with the case in which a single large plastic flow is caused, the plastic flow can be more accurately controlled, which enables formation of valve stem guide walls with a higher degree of accuracy.

According to the rocker arm manufacturing method of the invention [2], cutout portions having a desired shape can be assuredly formed, which enables smooth material flows at the subsequent pressing steps.

According to the rocker arm manufacturing method of the invention [3], more smooth material flows can be attained.

According to the rocker arm manufacturing method of the invention [4], more smooth material flows can be attained.

According to the rocker arm manufacturing method of the invention [5], at the time of pressing the pressing punches against the regions positioned below the cutout portions, it is possible to assuredly prevent the lower regions from being plastically fluidized toward the longitudinal direction of both side walls.

BRIEF DESCRIPTION OF THE DRAWINGS

FIGS. 1(a) to (c) are perspective views each showing a processed product at each processing step in a rocker arm manufacturing method according to an embodiment of the present invention, wherein FIG. 1(a) is a perspective view showing a flat blank product, FIG. 1(b) is a perspective view showing a flat blank product having holes, and FIG. 1(c) is a perspective view showing a bent product having holes.

FIGS. 2(a) to (c) are perspective views each showing a valve stem contacting end portion at each guide wall forming processing step according to the manufacturing method of the embodiment, wherein FIG. 2(a) is a perspective view thereof showing the state immediately after completion of the cutout forming step, wherein FIG. 2(b) is a perspective view thereof showing the state immediately after completion of the first pressing step, and wherein FIG. 2(c) is a perspective view thereof showing the state immediately after completion of the second pressing step.

FIGS. 4(a) to (c) are cross-sectional views each showing a valve stem contacting end portion at each guide wall forming processing step according to the manufacturing method of the embodiment, wherein FIG. 4(a) is a cross-sectional view showing the state immediately after completion of the cutout forming step, wherein FIG. 4(b) is a cross-sectional view thereof showing the state immediately after completion of the first pressing step, and wherein FIG. 4(c) is a cross-sectional view thereof showing the state immediately after completion of the second pressing step.

Figure 1:
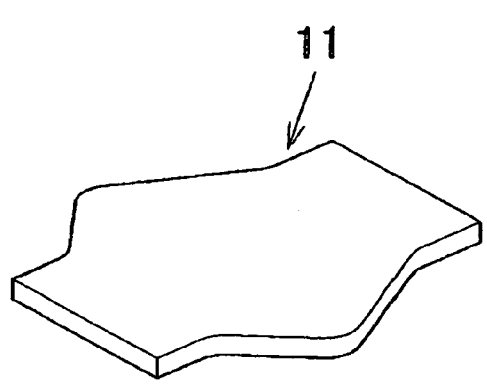
Figure 1:
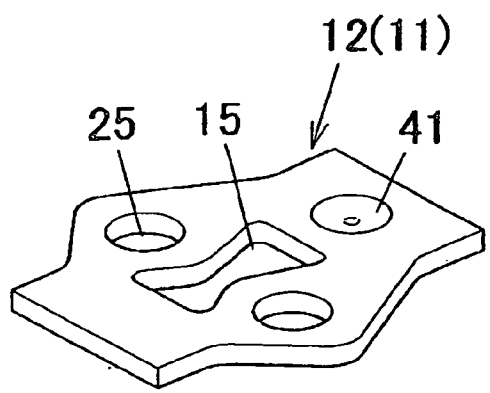
Figure 1:
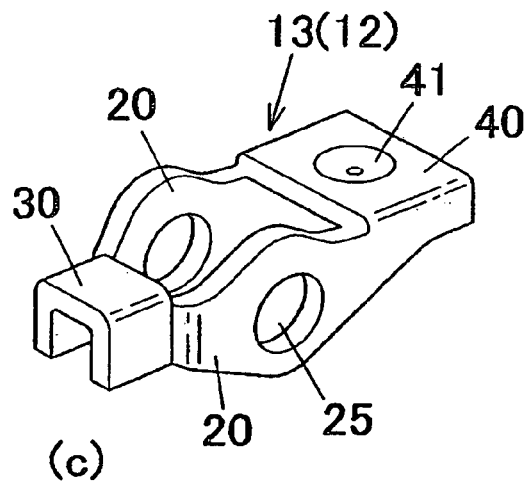

DESCRIPTION OF REFERENCE NUMERALS 10 rocker arm
13 bent product (intermediate product)
20 both side walls
30 one end side connection wall
31 cutout portion
32 raising wall
35 valve stem guide wall
60 cutout forming punch
61 pressing surface
70 first pressing punch
80 second pressing punch
81 pressing surface

BEST MODE FOR CARRYING OUT THE INVENTION

Hereinafter, a rocker arm manufacturing method according to an embodiment of the present invention will be detailed with reference to drawings.

Figure 2:
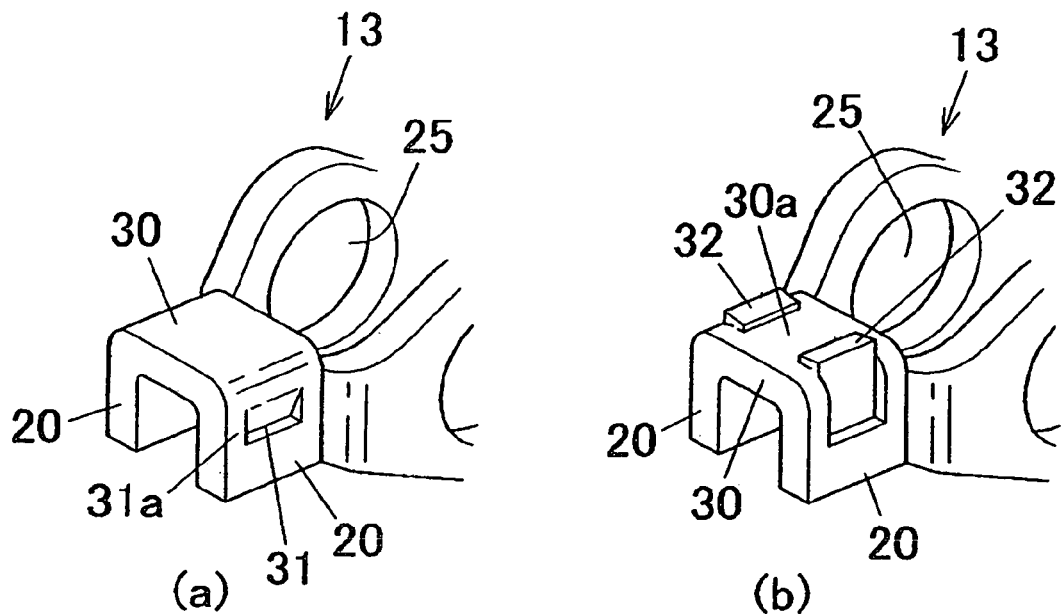

As shown in FIGS. 1 and 2, a rocker arm 10 to be manufactured in this embodiment is provided with a pair of side walls 20 extended in a longitudinal direction of the rocker arm 10 and disposed in parallel with each other, a one end side connection wall 30 connecting the lower ends of both side walls 20 at the longitudinal one end side (valve stem contacting side), and the other end side connection wall 40 connecting the other end side lower ends of both side walls 20 and having a pivot engaging concave portion 41. Both side walls 20 each has a shaft fixing hole 25 at its intermediate portion. At both side portions of the lower surface side of the one end side connection wall 30, a pair of valve stem guide walls 35 disposed in parallel with each other and extended in the longitudinal direction of the rocker arm are formed. Thus, the lower surface of the one end side connection wall 30 between both guide walls 35 constitutes a valve stem contacting surface 30a having a predetermined curvature for supporting a valve stem.

In manufacturing the rocker arm 10 having the aforementioned structure, initially, as shown in FIG. 1(a), predetermined regions of a steel plate as an original plate are punched out to obtain a flat blank product 11 having both sides each protruded in an arc-shape.

Then, as shown in FIG. 1(b), a hole forming punch is driven into the flat blank product 11 to punch out the intermediate region of the flat blank product 11 to form a hand-drum shaped central hole 15. Also predetermined regions in both side portions are punched out to form round shaft fixing holes 25. Thus, a flat blank product 12 having holes is obtained.

Furthermore, the intermediate region of the one end portion of the flat blank product 11 is dented by stretch forming to form a semispherical pivot engaging concave portion 41.

In executing the blanking processing for punching out the original plate, the punching processing for forming the central hole 15, the punching processing for forming the shaft fixing holes 25 and the stretch forming processing for forming the pivot engaging concave portion 41, the processing order is not limited and the processing can be performed in any order. For example, all of the aforementioned processing can be performed simultaneously, or two or more processing can be performed simultaneously. Alternatively, processing can be performed in order.

Next, as shown in FIG. 1(c), the flat blank product 12 with holes is bent into a U-shape (inverted U-shape) to obtain a bent product 13 having holes.

It should be noted that FIG. 1(c) illustrates the product in an upside-down manner with respect to the actual usage state to facilitate understanding of the invention (FIG. 2 also illustrate in the same manner).

Figure 3:
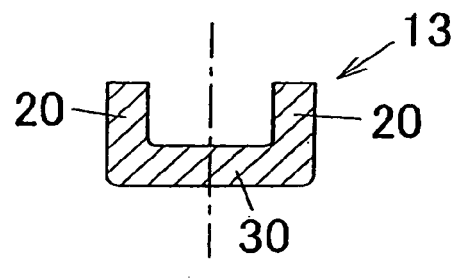
FIG. 3 is a cross-sectional view showing the valve stem contacting end portions of the bent product manufactured by the manufacturing method of the embodiment.

As shown in FIGS. 1(c) and 3, this bent product 13 is provided with both side walls 20, the one end side connection wall 30 connecting the lower ends of both side walls 20 at the one end portion thereof, and the other end side connection wall 40 connecting the lower ends of both side walls 20 at the other end portions thereof and having the pivot engaging concave-portion 41.

Next, cutting processing and pressing processing will be executed against the one end side end portion (valve stem connecting side end portion) of the bent product 13.

Figure 4:
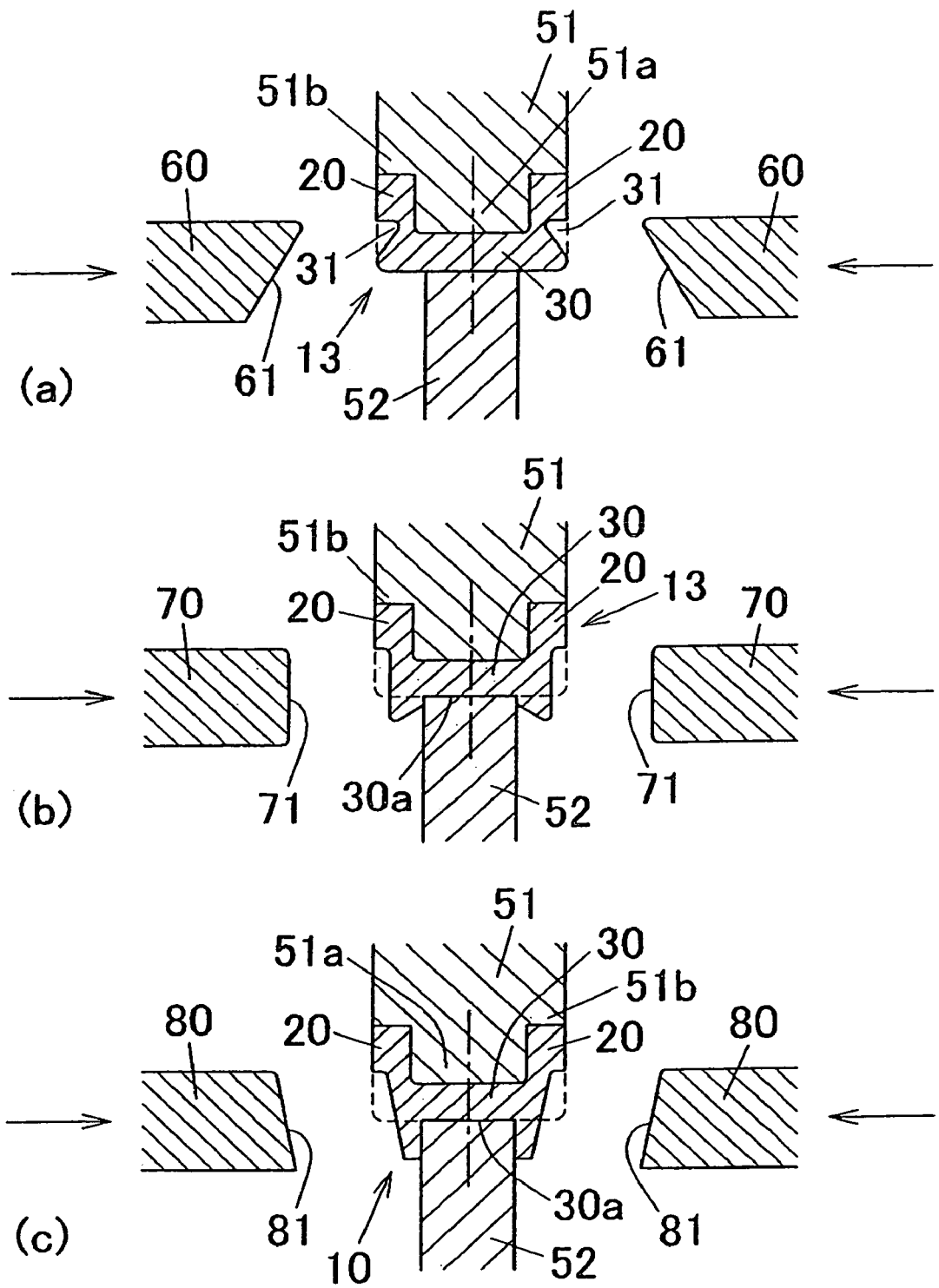

As shown in FIG. 4, the device for executing the cutting processing and the pressing processing is provided with a pair of upper and lower dies 51 and 52 for supporting the bent product 13 by clamping it from its upper and lower sides.

The upper die 51 is configured to be inserted in between both side walls 20 formed at the one end portion of the bent product 13, and is provided with an intermediate portion 51a for immovably supporting the inner surface of the one end side connection wall 30 and the inner surfaces of both side walls 20 and both side portions 51b for immovably supporting the upper ends of both side walls 20. The lower die 52 is configured to immovably support the intermediate region (valve stem contacting surface 30a) of the lower surface of the one end side connection wall 30 other than both side portions thereof. In this embodiment, it is configured such that the upper die 51 is movable in the up-and-down direction and that the bent product 13 can be supported by and between the upper and lower dies 51 and 52 by lowering the upper die 51 after disposing the bent product 13 on the lower die 52 in a state in which the upper and lower dies 51 and 52 are away from each other.

The lower die 52 is formed to have a width corresponding to the width of the valve stem contacting surface 30a. At the time of executing the punching operation which will be mentioned later, the lower die 52 is configured to restrain the inner side surfaces of the guide walls 35 to define the intervening size of the guide walls 35 accurately.

In this embodiment, in the state in which the bent product 13 is securely supported by being clamped from the upper and lower sides with the upper and lower dies 51 and 52, cutout forming punches 60 each having a wedge-shape (deformed V-shape) are pressed against the outer surface portions of both side walls 20 in a direction perpendicular to the outer surface of the side wall to thereby form cutout portions 31.

In this cutout forming punch 60, the pressing surface 61 is formed to have a downwardly inclined surface which retreats with respect to the pressing direction toward the lower side. The upper end of the pressing surface 61 is formed as a pressing tip end portion most protruded forwardly.

In this embodiment, the inclination angle θ1 of the pressing surface 61 of the cutout forming punch 60 with respect to the horizontal plane (pressing direction) is preferably set to 40 to 80°, more preferably 50 to 70°, still more preferably 55 to 65°.

Setting the inclination angle θ1 within the aforementioned ranges enables assured formation of the cutout portion 31 having a preferable shape by pressing the cutout forming punch 60. In detail, if the inclination angle θ1 is too small, the pressing tip end portion 62 becomes sharp to cause a concentrated pressing load, resulting in an easy-to-break punch 60. Thus, the punch 60 cannot be used over the long period, which may cause deteriorated durability (short life). To the contrary, if the inclination angle θ1 is too large, the energy loss increases, and assured formation of the cutout portion 31 having a preferable shape cannot be attained, which may cause harmful deformation.

By pressing the cutout forming punches 60, cutout portions 31 extended in the longitudinal direction will be formed on the outer surface portions of both side walls 20. At this time, while cutout portions 31 are being formed by the punches 60, regions positioned below the cutout portions 31 on the outer surface portions of both side walls 201 will be moved downward along the downwardly inclined pressing surfaces 61 of the punches 60 to form cutout portions 31 each having a shape corresponding to the pressing tip end portion 62 of the punch 60.

Figure 5:
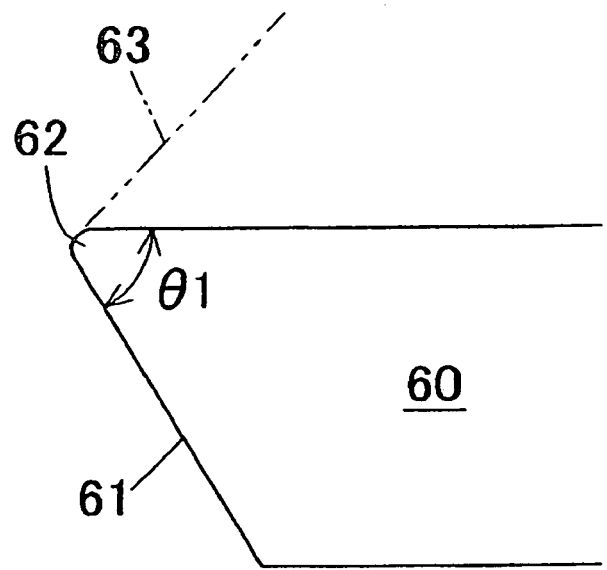
FIG. 5 is an enlarged cross-sectional view showing the cutout forming punch employed at the cutout forming step in the manufacturing method of the embodiment.

The cutout forming punch 60 can be formed to have an inclined pressing surface 63 at the upper side of the pressing tip end portion 62 as shown in the phantom line of FIG. 5. In this case, the pressing tip end portion 62 can be formed to have an obtuse angle, enabling dispersion of the pressing load, which in turn can improve the durability. However, when the cutout forming punch 60 is driven in, the region located above the cutout portion 31 on the outer surface portion of the side wall 20 will be pressed upwardly by the upper side inclined pressing surface 63 of the punch 60, which may cause harmful deformation.

Accordingly, in this embodiment, it is preferable that the upper surface of the cutout forming punch 60 is formed into a flat horizontal surface and no inclined pressing surface 63 is formed above the pressing tip end portion 62.

The cutout portions 31 are formed at the longitudinal intermediate portions of the one end side end portion of both side walls 20 and no cutout portion 31a is formed at the forward and rearward portions of the one end side end portion. In other words, when the longitudinal direction is defined as a front-and-rear direction, the front end portion of the cutout portion 31 is positioned behind the front end portion of the side wall 20 and the rear end portion of the cutout portion 31 is positioned ahead of the rear end portion of the side wall 20.

In the present invention, the cutout portions 31 can be formed over the entire longitudinal regions of both side wall 20 of the valve stem contacting side end portions. Like in this embodiment, it is preferable that no cutout portion 31a is formed at portions behind and ahead of the cutout portions 31.

Furthermore, in this embodiment, the cutout depth of the cutout portion 31 is not specific-ally limited, but preferably set to ⅓ to ⅔ of the thickness of the side wall 20. In this case, the plastic flow, which will be explained, can be performed smoothly, resulting in assured formation of desired valve stem guide walls 35.

Furthermore, it is preferable that the vertical position of the cutout portion 31 is set so that the horizontal surface among inner surfaces of the cutout portion 31 is positioned slightly above the inner surface position (upper surface position) of the one end side connection wall 30.

After forming the cutout portion 31 as shown in FIGS. 2(b) and 4(b), first pressing punches 70 will be pressed against both side walls 20 of the bent product 13 from the outsides thereof.

In this first pressing punch 70, the pressing surface 71 is formed into a vertical surface perpendicular to the pressing direction and parallel to the outer surfaces of both side walls 20. These pressing surfaces 71 will be pressed against the lower side regions of the outer surface portions of both side walls 20 of the bent product 13 positioned below the cutout portions 31. This causes downward plastic flows of the lower side regions of the outer surface portions to thereby form rising walls 32 extended in the longitudinal direction at both sides of the lower surface of the one end side connection wall 30.

The pressing surface 71 of the first pressing punch 70 is not always formed into a vertical plane and can be inclined downward or upward to some extent.

At the time of executing the pressing operations of the first pressing punches 70, the inner side surfaces of both raising walls 32 will be restrained by the lower die 52, assuredly preventing the raising walls 32 from being inwardly deformed, which in turn can secure a high degree of dimensional accuracy.

After forming the raising walls 32, as shown in FIGS. 2(c) and 4(c), second pressing punches 80 (finishing punches) will be pressed against both side walls 20 of the bent product 13 from the outside thereof. As a result, the region covering from the cutout position on the outer surface portion of the side wall 20 to the upper end position of the raising wall 32 will be plastically fluidized downward, which forms valve stem guide walls 35 each having a sufficient height at the lower surface both sides of the connection walls 30.

In this second pressing punch 80, the pressing surface 81 is formed into a slightly upwardly inclined surface so that the pressing surface 81 advances in the pressing direction toward the lower side.

Figure 6:
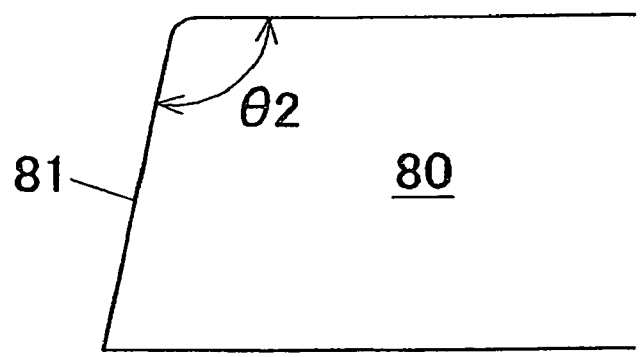
FIG. 6 is an enlarged cross-sectional view showing the second processing punch employed at the second pressing step in the manufacturing method of the embodiment.

As shown in FIG. 6, in this embodiment, the inclination angle θ2 of the pressing surface 81 of the second pressing punch 80 with respect to the horizontal plane (pressing direction) is preferably set to 93 to 115°, more preferably 95 to 105°.

That is, by setting the inclination angle θ2 within the aforementioned range, desired guide walls 35 can be assuredly formed by the pressing operations of the second pressing punches 80.

At the time of the pressing operation of the second pressing punch 80, in the same manner as mentioned above, the lower die 52 restrains the inner side surfaces of the guide walls 35, preventing the guide walls 35 from being inwardly deformed, which makes it possible to maintain a high degree of dimensional accuracy.

As explained above, according to the arm rocker manufacturing method of this embodiment, in forming the guide walls 35 on the one end side connection wall 30, after forming the cutout portion 31 on the outer surface portions of both side walls 20, the regions positioned below the cutout portions 31 are pressed with the pressing punches 70 to be plastically fluidized downward to thereby form the guide walls 35. Therefore, the pressed outer surface portions of both side walls will be accurately fluidized downward, which makes it possible to assuredly and stably form the guide walls 35.

Just for information, when the valve stem side end portion is press-formed with a die having an external peripheral configuration corresponding to that of the valve stem side end portion of a rocker arm as disclosed by the aforementioned Patent Document 1 (JP, 2001-198641, A), the materials of both side walls were plastically fluidized upward unintentionally and therefore there was the possibility of causing harmful deformation. To the contrary, in this embodiment, as explained above, it is possible to assuredly prevent the problem of upward material flows of the valve stem side end portion, which can attain accurate controlling of the downward material flow.

Furthermore, in this embodiment, since the outer surface portions of both side walls 20 are pressed by a total of two pressing operations at the first and second pressing steps to gradually fluidize the material, as compared with the case in which the material is plastically fluidized largely by a single pressing operation, the plastic flow can be controlled more accurately, resulting in assured formation of valve stem guide walls 35 each having a higher degree of accuracy.

In this embodiment, the front end portion of the cutout portion 31 is not extended to the front end surface of the side wall 20, i.e., a non-cutout portion 31a having no cutout portion is provided at the front end portion of the side wall 20. Therefore, in pressing the regions positioned below the cutout portions 31 at the pressing step, the lower regions are assuredly prevented from being plastically fluidized toward the front of the side walls 20, enabling more accurate control of the material flow, which enables more stable formation of the guide walls 35.

In the present invention, the number of pressing operations of the first pressing punches 70 at the first pressing step and the number of pressing operations of the second pressing punches 80 at the second pressing step are not limited to one. Such operation can be performed several times so as to cause gradual plastic flows. Furthermore, the number of pressing operations of the cutout forming punches 60 is also not limited to one. Such cutout forming operation can be performed several times so as to cause gradual formation of the cutout portion 31. In short, the present invention covers that the cutout forming punch and the pressing punch are driven at least one time.

Example

In accordance with the rocker arm manufacturing method of the aforementioned embodiment, a bent product 13 having holes was prepared. The side wall plate thickness (thickness) of this bent product 13 was 3.2 mm.

Next, in this bent product 13, using the guide wall forming press working device similar to that of the aforementioned embodiment, cutout portions 31 were formed by the cutout forming punches 60 on both side walls 20 of the valve stem contacting side. At this cutout forming step, a cutout forming punch 60 in which an inclination angle θ1 of the pressing surface was 60° was used.

The cutout depth was set to ½ of the plate thickness of the bent product 13, i.e., 1.6 mm. The cutout position was set so that the horizontal surface of the cutout portion 31 among the inner surfaces thereof was positioned slightly above the inner surface position (upper surface position) of the one end side connection wall 30.

After the cutout forming step, a first pressing step by the first pressing punches 70 was performed. At this time, as the first pressing punch 70, a pressing punch having a pressing surface finished to be perpendicular to the pressing direction (vertical surface). By this first pressing step, the regions positioned below the cutout portions 31 of both side wall outer surface portions were plastically fluidized downward to form the raising walls 32.

Next, a second pressing step by the second pressing punches 80 was performed. At this time, as the second pressing punch 80, a pressing punch in which the inclination angle θ2 of the pressing surface was set to 95 to 105° was used. By this second pressing step, the regions covering from the cutout portions 31 of the outer surfaces of the side walls to the raising walls 32 were further plastically fluidized downward to form the valve stem guide walls 35.

In this manufacturing method, desired valve stem guide walls 35 could be formed stably and a high quality rocker arm 10 was obtained.

This application claims priority to Japanese Patent Application No. 2005-239808 filed on Aug. 22, 2005, the entire disclosure of which is incorporated herein by reference in its entirety.

The terms and descriptions used herein are intended to explain the embodiments of the present invention and the present invention is not limited thereto. The present invention allows any design modifications falling within the scope of claims unless it extends beyond the spirits of the present invention.

INDUSTRIAL APPLICABILITY

The present invention can be applied to a method of manufacturing a rocker arm for opening and closing a valve for use in, e.g., a valve gear for vehicle internal combustion engines.

The invention claimed is:

1. A method for manufacturing a rocker arm, the method comprising:
    a step of obtaining an intermediate product having both side walls extended in a predetermined direction and arranged in parallel with each other and a one end side connection wall connecting lower ends of both the side walls at a longitudinal one end side of the intermediate product;
    a cutout forming step of forming cutout portions extended in a longitudinal direction of the intermediate product on outer surface portions of both the side walls by pressing cutout forming punches against both side walls located at one end side of the intermediate product from the outside thereof;
    a first pressing step of forming raising walls in a downwardly protruded manner at both sides of the one end side connection wall by pressing a first pressing punch against the outer surface portions of both the side walls from the outside thereof to cause downward plastic flows of regions of the outer surface portions of both the side walls positioned below the cutout portions; and
    a second pressing step of forming valve stem guide walls by pressing second pressing punches against both the raising walls of the one end side connection wall.

2. The method for manufacturing a rocker arm as recited in claim 1, wherein the cutout forming punch is formed to have a pressing surface constituted by a downwardly inclined plane in which the pressing surface retreats with respect to a pressing direction toward a lower side thereof.

3. The method for manufacturing a rocker arm as recited in claim 2, wherein the first pressing punch is formed to have a pressing surface perpendicular to a vertical plane.

4. The method for manufacturing a rocker arm as recited in claim 3, wherein the second pressing punch is formed to have a pressing surface formed by an upwardly inclined plane in which the pressing surface advances with respect to a pressing direction toward a lower side thereof.

5. The method for manufacturing a rocker arm as recited in claim 4, wherein end portions of the cutout portions are not extended to longitudinal end portions of both side walls, whereby no cutout portion is formed at the longitudinal end portions of both side walls.

6. The method for manufacturing a rocker arm as recited in claim 1, wherein the first pressing punch is formed to have a pressing surface perpendicular to a vertical plane.

7. The method for manufacturing a rocker arm as recited in claim 6, wherein the second pressing punch is formed to have a pressing surface formed by an upwardly inclined plane in which the pressing surface advances with respect to a pressing direction toward a lower side thereof.

8. The method for manufacturing a rocker arm as recited in claim 7, wherein end portions of the cutout portions are not extended to longitudinal end portions of both side walls, whereby no cutout portion is formed at the longitudinal end portions of both side walls.

9. The method for manufacturing a rocker arm as recited in claim 1, wherein the second pressing punch is formed to have a pressing surface formed by an upwardly inclined plane in which the pressing surface advances with respect to a pressing direction toward a lower side thereof.

10. The method for manufacturing a rocker arm as recited in claim 9, wherein end portions of the cutout portions are not extended to longitudinal end portions of both side walls, whereby no cutout portion is formed at the longitudinal end portions of both side walls.

11. The method for manufacturing a rocker arm as recited in claim 2, wherein the second pressing punch is formed to have a pressing surface formed by an upwardly inclined plane in which the pressing surface advances with respect to a pressing direction toward a lower side thereof.

12. The method for manufacturing a rocker arm as recited in claim 11, wherein end portions of the cutout portions are not extended to longitudinal end portions of both side walls, whereby no cutout portion is formed at the longitudinal end portions of both side walls.

13. The method for manufacturing a rocker arm as recited in claim 1, wherein end portions of the cutout portions are not extended to longitudinal end portions of both side walls, whereby no cutout portion is formed at the longitudinal end portions of both side walls.

14. The method for manufacturing a rocker arm as recited in claim 2, wherein end portions of the cutout portions are not extended to longitudinal end portions of both side walls, whereby no cutout portion is formed at the longitudinal end portions of both side walls.

15. The method for manufacturing a rocker arm as recited in claim 3, wherein end portions of the cutout portions are not extended to longitudinal end portions of both side walls, whereby no cutout portion is formed at the longitudinal end portions of both side walls.

16. The method for manufacturing a rocker arm as recited in claim 6, wherein end portions of the cutout portions are not extended to longitudinal end portions of both side walls, whereby no cutout portion is formed at the longitudinal end portions of both side walls.

* * * * *